Oct. 17, 1944.　　　A. A. SAWICKI　　　2,360,588
UNIVERSAL INDEXING DEVICE
Filed March 20, 1943　　　2 Sheets-Sheet 1

INVENTOR.
ARTHUR A. SAWICKI
BY
Frank H. Harmon
ATTORNEY

Oct. 17, 1944.  A. A. SAWICKI  2,360,588
UNIVERSAL INDEXING DEVICE
Filed March 20, 1943  2 Sheets-Sheet 2

INVENTOR.
ARTHUR A SAWICKI
BY
Frank H Harmon
ATTORNEY

Patented Oct. 17, 1944

2,360,588

UNITED STATES PATENT OFFICE 2,360,588

UNIVERSAL INDEXING DEVICE

Arthur A. Sawicki, Gates Mills, Ohio, assignor to Jack & Heintz, Inc., Bedford, Ohio, a corporation of Ohio Application March 20, 1943, Serial No. 479,855

1 Claim. (Cl. 90—57)

This invention relates in general to indexing devices and more particularly to improvements in indexing devices for work holding devices.

One of the primary objects of the invention is to provide an indexing device that will be simple in construction and operation and capable of easy adjustment and certainty of alignment of the work with the tool so as to permit the alignment and tooling of a certain piece work from various angles without removing the work from the index turntable.

With the foregoing and other objects in view, the invention resides in the combination of parts and in the details of construction hereinafter set forth in the following specification and appended claim, certain embodiments thereof being illustrated in the accompanying drawings, in which:

Figure 1:
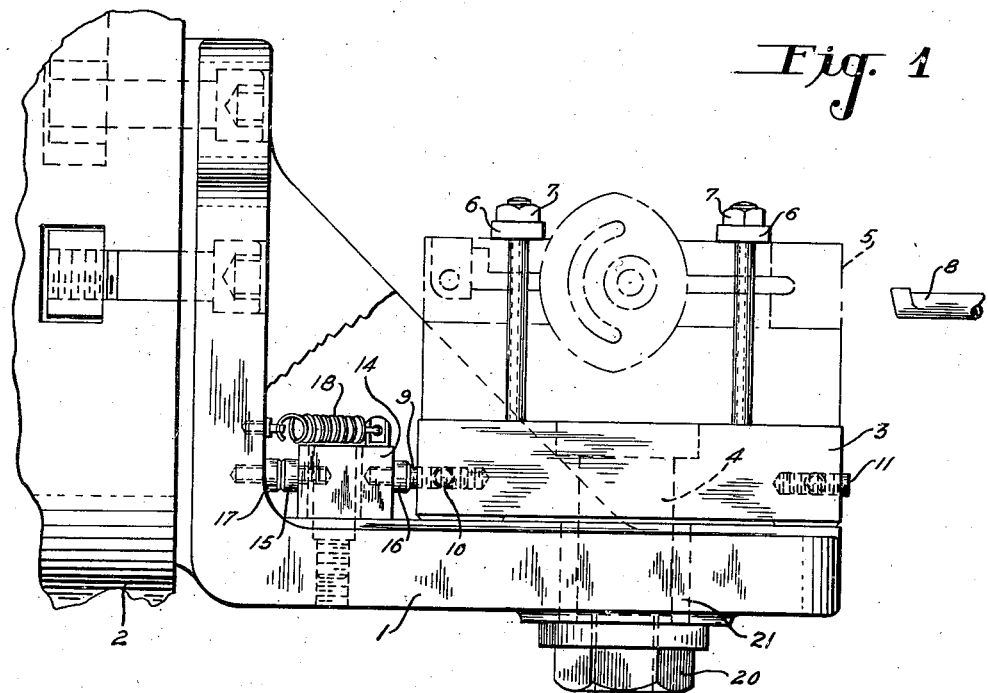
Figure 1 is a view in side elevation of a base, the work supporting turntable and the indexing member, the tool being shown diagrammatically out of engagement with the work.
Figure 2:
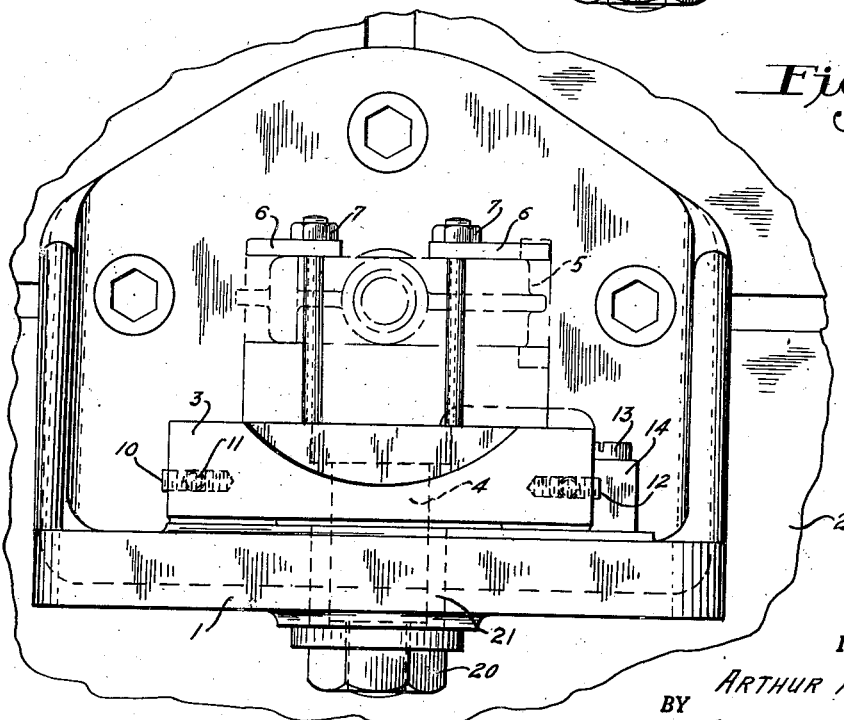
Figure 2 is a similar showing in front elevation, or at right angles to Figure 1.
Figure 3:
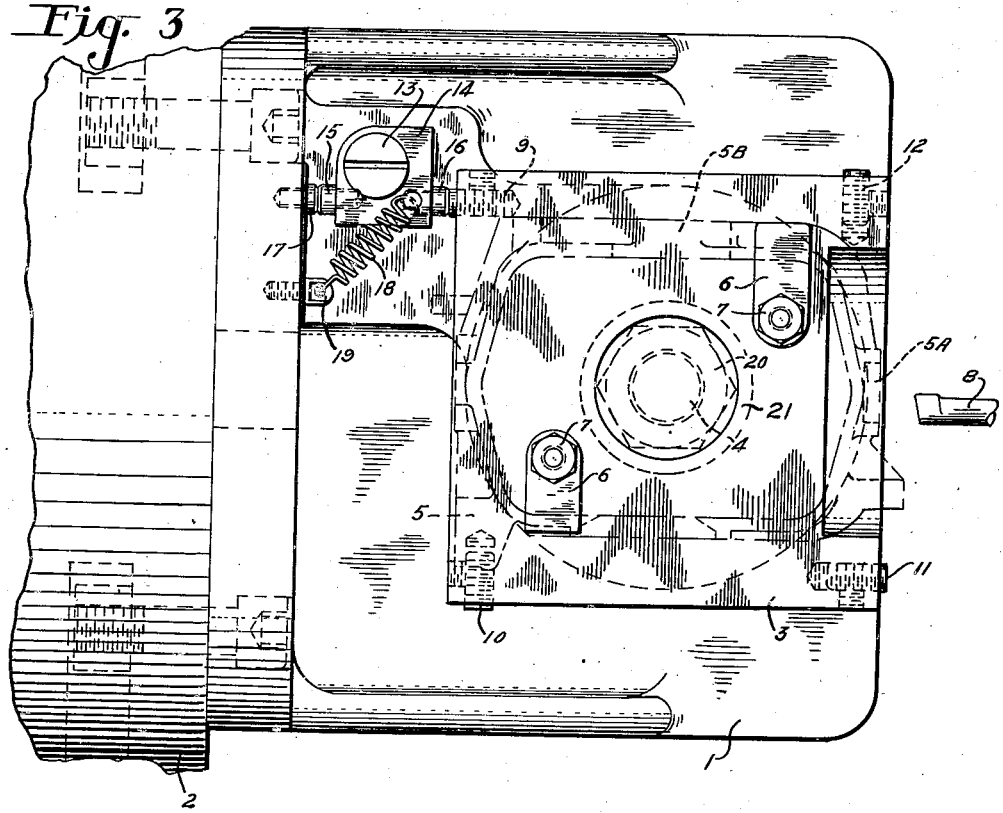
Figure 3 is a top plan view of the same.

Referring more particularly to the drawings, upon the base 1, attached to a support 2, is a turntable 3 mounted for rotation about a shaft 4 provided with a bushing 21.

The work 5 may be removably secured to the turntable by clamps 6 held in place by bolts 7. The turntable is shown to be rectangular in form as a means of illustration, but it must be understood that it may be of any convenient shape. The point is that in the present showing the rotatable turntable permits four sides of the work to be separately aligned with the tool 8. The indexing and alignment is accomplished in the following manner. In the four edges near the four corners of the turntable are inserted four adjustable set screws 9, 10, 11 and 12 protruding to the desired predetermined extent. Secured to the base by means of a bolt 13 so as to be rotatable is an index block 14. The block is provided with two adjustable set screws 15 and 16 protruding from opposite sides to a predetermined desired extent. The base also has an adjustable protruding set screw 17. The index block is spring biased in a clockwise direction by a tension spring 18 secured to the block and a pin 19 carried by the base. This normally brings the block set screw 15 into abutment and alignment with base set screw 17. In the drawings, it also brings the block set screw 16 into abutment and alignment with the turntable set screw 9. This brings the particular side portion 5A of the work into alignment with tool 8 for reaming or boring or other tool operation. In order to maintain the turntable in such adjusted position, a simple turning of a nut 20 clamps the turntable in set position.

Figure 4:
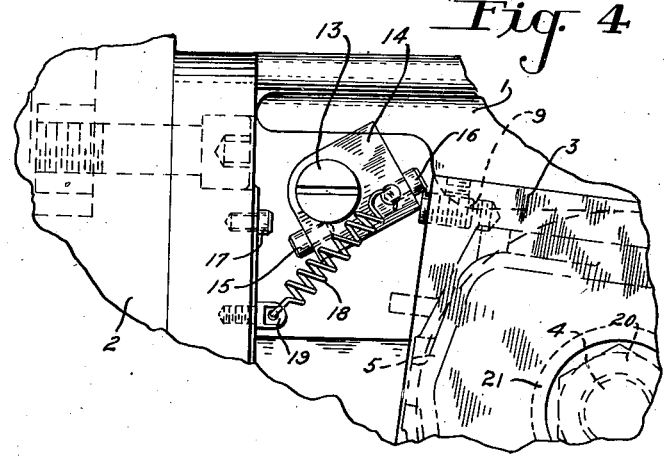
Figure 4 is a fragmentary top plan view, showing the turntable being moved part way from one position to another.

As soon as the required tooling operation has been completed on the side portion 5A, the tool is withdrawn and nut 20 loosened. The turntable is then easily and readily rotated in a clockwise direction against the action of spring 18, as illustrated in Figure 4, until the index block set screw 16 comes into abutment and alignment with the turntable set screw 10 at which time the side portion 5B is in proper aligned position to be engaged by the tool 8 for tooling operation which is consummated after tightening nut 20. This operation is repeated so as to separately align the two other turntable set screws 11 and 12 into alignment with the block set screw 16 and the other two sides of the work into proper alignment with the tool for machining operations.

With the various set screws being adjustable the alignment of the four sides of the work separately with the tool may be readily accomplished and four machining operations completed in the minimum amount of time and effort.

I claim:

In combination in an indexing device, a base and a work supporting turntable rotatably mounted thereon, means for automatically aligning said turntable in a plurality of separate positions for engagement with an operating tool upon a rotation of said turntable, and a clamping device for releasably clamping said turntable and work in such adjusted positions, a spring biased index block pivotally mounted on said base, an adjustable limiting stop therefor carried by said base, resilient means extending between said block and said base to maintain said block in engagement with said stop, a plurality of adjustably and predeterminedly spaced abutment members carried by said turntable and an adjustable abutment member carried by said block to contact first named abutment members and automatically align said work with said tool in any one of a plurality of adjusted positions.

ARTHUR A. SAWICKI.